C. E. WOOLDRIDGE.
SEED PLANTER.
APPLICATION FILED SEPT. 21, 1918.
1,293,603.
Patented Feb. 4, 1919.
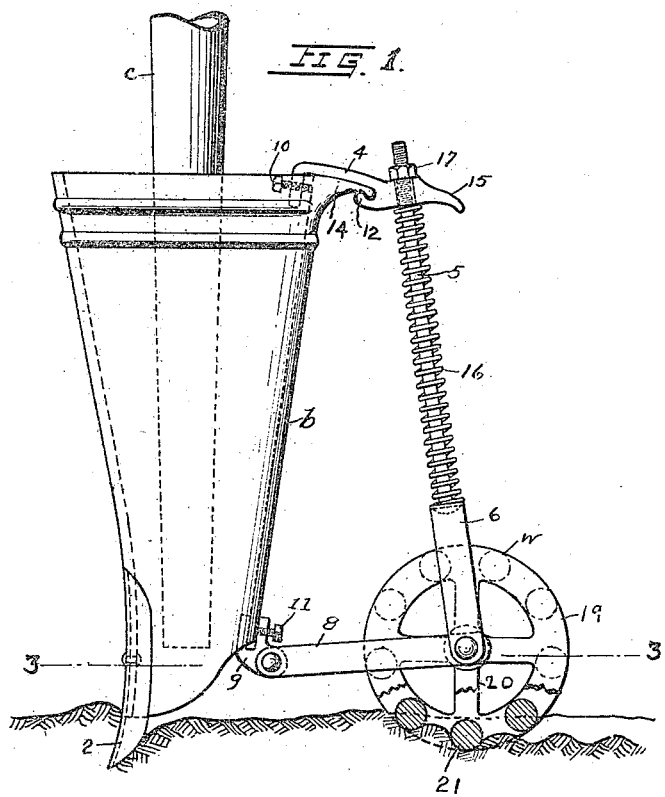
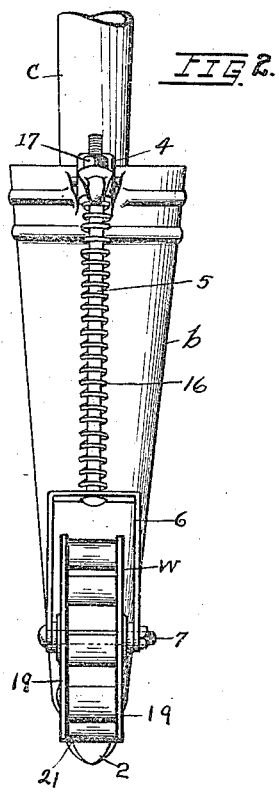
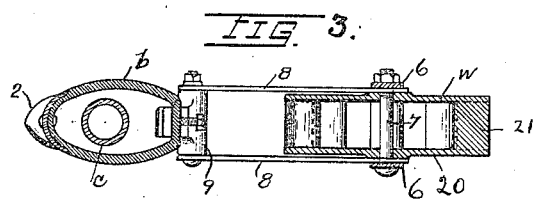
Witness
Geo. E. Kricker.
Inventor
C. E. Wooldridge
By Fisher & Moser
Attorney

UNITED STATES PATENT OFFICE.

CHARLES E. WOOLDRIDGE, OF JEROMEVILLE, OHIO.

SEED-PLANTER.

1,293,603.  Specification of Letters Patent.  Patented Feb. 4, 1919.

Application filed September 21, 1918.  Serial No. 255,187.

*To all whom it may concern:*

Be it known that I, CHARLES E. WOOLDRIDGE, a citizen of the United States, residing at Jeromeville, in the county of Ashland and State of Ohio, have invented certain new and useful Improvements in Seed-Planters, of which the following is a specification.

My invention consists in an attachment for grain drills and particularly for such as are used for sowing wheat and other small grains, like rye, oats and barley, and a boot used in such planters is shown with my attachment affixed thereto, all substantially as shown and described and particularly pointed out in the claims.

In the accompanying drawings, Figure 1 is a side elevation of the attachment as an article of manufacture and a drill boot with which it is operatively connected, and Fig. 2 is a rear elevation of Fig. 1. Fig. 3 is a cross section on line 3—3, Fig. 1, looking down.

In grain drills or seed planters having boots more or less as shown the seed is dropped into the earth and covered by the earth falling in loosely behind the tongue of the shoe over the grain. It is desirable in practically all kinds of soil to have a medium adapted to follow the boot and compact the earth with something of a corrugating effect in order to put the earth in the most favorable condition possible to promote prompt germination and to help the tender shoot to push through to the surface. This is especially true in the spring following the planting to prevent the plant from being lifted out of the earth by the successive freezings and thawings and consequent destruction of the crop, and which is a too common experience with winter wheat. By my invention this disastrous effect is prevented and the wheat holds its stand in the earth about equally well in all kinds of soil and does not freeze out, as it is commonly called.

These and other advantageous effects are obtained by the present invention in so far as the planting and growing of the grain are concerned, while there is also a mechanical value in the working relation between the boot and the attachment and through which the running depth of the boot in the soil is more or less graduated, all as will now be more fully described.

The boot *b* is of the conventional type in seed or grain drills, and the seed is dropped through tube *c*, as usual in such machines. The boot also has the usual tooth or tongue 2 at its toe adapted to open or furrow the soil directly in advance of the falling grain, so that the grain is covered by the earth rolling or falling in over the same from the sides as the tooth passes along.

To these old elements and practices I bring my new attachment, and which is adapted to be affixed to such boots as are now in use as well as to those which may hereafter be manufactured, and which has the dual function of a wheeled carrier with depth adjustment for the boot, and of a covering and soil surfacing, compacting and corrugating medium as above suggested. The said attachment comprises a wheel or roller W of a construction peculiar to the needs of the work, and of a size proportioned preferably about as shown, say five inches, more or less, in height, and one to two inches, more or less, across the tread, and rotatably supported in line behind the boot by means of a bracket 4, affixed to the top and rear of the boot, a rod 5 engaged through said bracket, a yoke 6 affixed to the rod and between the arms of which the wheel is mounted on a spindle 7 extending through the ends of said arms, and links 8 connected with the ends of said spindle at one end and with a bracket 9 on the heel of the boot at the other end. Both brackets 4 and 8 have set screws 10 and 11 respectively, by which they are separably affixed to the boot, and in addition the bracket 4 has a lip 12 at its bottom engaged beneath the end of the fixed projection 14 on the boot and a grip 15 on its outer terminal adapted to be engaged by the hand to lift an individual boot.

The rod 5 passes through a hole in bracket 4 and is encircled by a spiral wire spring 16 resting on the yoke or stirrup 6 and bearing against bracket 4 at its upper end. A nut 17 on rod 5 above said bracket serves to raise the wheel W more or less in respect to the boot against the down pressure of the spring, while the spring serves to keep the wheel down at work under more or less yielding pressure as may be required.

The wheel W is an open work or skeleton member having side rims 19, spokes 20 and transverse rounds or ribs 21 in its tread between the rims, the said rounds extending from side to side of the wheel and the spaces between the rounds about equal to the cross section of the rounds and open into the wheel, so that there can be no clogging or packing of the earth in the wheel. This construction produces an undulating, wavy or corrugated track in the soil but the physical effects on the soil are exactly what I want because, while the soil is more or less pressed or compacted upon or about the seed, ojectionable clods are crushed, the earth is left with comparatively loose ridges between the depressions and the objection of continuous solid packing is avoided. The earth also is left in the best possible condition for the uniform development and springing forth of the tender plants through the soil because the conditions of their growth are made uniform and in this way an even stand and a good healthy start of all the plants alike is assured. Then, as the spring freezings and thawings appear, the compacted earth holds the roots and they withstand the alternating changes of the weather without injurious effects.

The cross portions or ribs 21 are preferably shown as rounds but they may have any equivalent shape and disposition in the wheel, and whereby a corrugating compacting effect on the earth is obtained.

What I claim is:

1. In seed drills, the combination of a boot and an attachment behind the boot comprising a wheel having a tread provided with cross ribs adapted to corrugate and pack the earth over the seed, the said ribs having open spaces between them substantially equal to the thickness of the ribs, and means to connect the wheel with both ends of the boot.

2. The combination with a boot in a grain drill, with a wheel behind the same having cross ribs in the tread with spaces between the ribs substantially equal to the thickness of the ribs and adapted to corrugate and pack the earth over which it travels, and means to hold the wheel in working position comprising a yoke connected with the axle thereof, a bracket having engaging lips fixed rigidly to the top and rear of the boot, a rod engaged with said bracket and said yoke at its ends and means adapted to depress the wheel.

Signed at Jeromeville in the county of Ashland, and State of Ohio, this 14th day of September, 1918.

CHARLES E. WOOLDRIDGE.

Copies of this patent may be obtained for five cents each, by addressing the "Commissioner of Patents, Washington, D. C."